United States Patent
Levin et al.

(10) Patent No.: US 8,023,135 B2
(45) Date of Patent: Sep. 20, 2011

(54) INTERFACE FOR BUILDING A PRINT CONTAINER

(75) Inventors: Burton Lee Levin, Lake Oswego, OR (US); James E. Owen, Vancouver, WA (US); Alex Lane Johnson, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 841 days.

(21) Appl. No.: 12/040,683

(22) Filed: Feb. 29, 2008

(65) Prior Publication Data

US 2009/0219550 A1 Sep. 3, 2009

(51) Int. Cl.
*G06K 15/00* (2006.01)
*G06F 3/12* (2006.01)

(52) U.S. Cl. ................... 358/1.15; 358/1.16

(58) Field of Classification Search ........... 358/1.18, 358/1.6, 1.12, 1.15, 404, 444, 1.16, 1.17
See application file for complete search history.

(56) References Cited

U.S. PATENT DOCUMENTS

| | | | |
|---|---|---|---|
| 6,377,286 B1 * | 4/2002 | Hochmuth | 715/810 |
| 2002/0147739 A1 * | 10/2002 | Clements et al. | 707/500 |
| 2005/0036170 A1 | 2/2005 | Okuoka et al. | |
| 2007/0136660 A1 * | 6/2007 | Gurcan et al. | 715/513 |
| 2007/0216944 A1 * | 9/2007 | Furuya | 358/1.15 |
| 2008/0024802 A1 | 1/2008 | Kato | |
| 2009/0086239 A1 | 4/2009 | Selvaraj | |

FOREIGN PATENT DOCUMENTS

| | | |
|---|---|---|
| JP | 11-129586 | 5/1999 |
| JP | 11-179993 | 7/1999 |
| JP | 2001-125757 | 5/2001 |
| JP | 2001-339542 | 12/2001 |
| JP | 2003-084941 | 3/2003 |
| JP | 2005-063099 | 3/2005 |
| JP | 2008-287601 | 11/2008 |
| JP | 2008-293303 | 12/2008 |
| JP | 2008-293304 | 12/2008 |
| JP | 2009-087357 | 4/2009 |

* cited by examiner

*Primary Examiner* — Jerome Grant, II
(74) *Attorney, Agent, or Firm* — Law Office of Gerald Maliszewski; Gerald Meliszewski

(57) ABSTRACT

A method is provided for creating a print container with a series of resident fixed documents. The method opens a user interface (UI). Using the UI, a first plurality of elements stored in memory is selected and a print container is created. The print container preserves a second plurality of elements as separate entities in the print container. For example, a print container may have an element hierarchy of jobs in the print container, fixed documents in a job, and fixed pages in a fixed document may be created. Elements are defined as print containers, fixed documents, application-specific documents, page description language (PDL) documents, extensible markup language (XML) paper specification (XPS) fixed documents, or combinations of the above-mentioned elements. In one aspect, the selected elements are extensible markup language (XML) paper specification (XPS) fixed documents, which are preserved as separate entities in an XPS container.

24 Claims, 8 Drawing Sheets

Fig. 5A

| SOURCE DOCUMENTS | PRINT CONTAINER IN GDI | PRINT CONTAINER |
|---|---|---|
| MY REPORT.DOC<br>PAGE 1: PORTRAIT<br>PAGE 2: LANDSCAPE<br>PAGE 3: PORTRAIT | PRINT SETTINGS:<br>PORTRAIT<br>PAGE 1<br>RESETDC: LANDSCAPE<br>PAGE 2<br>RESETDC: PORTRAIT<br>PAGE 3 | JOB<br>  DOCUMENT 1<br>    PAGE 1<br>    PAGE 2<br>    PAGE 1<br>  PRINT TICKETS<br>    DOCUMENT 1 PRINT TICKET:<br>      PORTRAIT<br>    PAGE 2 PRINT TICKET:<br>      LANDSCAPE |
| MY INVOICE.XLS<br>PAGE 1: LANDSCAPE<br>PAGE 2: LANDSCAPE | PRINT SETTINGS:<br>LANDSCAPE<br>PAGE 1<br>PAGE 2 | JOB<br>  DOCUMENT 1<br>    PAGE 1<br>    PAGE 2<br>  PRINT TICKETS<br>    DOCUMENT 1 PRINT TICKET:<br>      LANDSCAPE |

Fig. 5B

| MERGED DOCUMENT | PRINT CONTAINER IN GDI | PRINT CONTAINER IN XPS |
|---|---|---|
| MERGEDDOC.PRN (ONLY PRINT COMMANDS) | PRINT SETTINGS: PORTRAIT PAGE 1 RESETDC: LANDSCAPE PAGE 2 RESETDC: PORTRAIT PAGE 2 RESETDC: LANDSCAPE PAGE 1 PAGE 2 | JOB DOCUMENT 1 PAGE 1 PAGE 2 PAGE 1 DOCUMENT 2 PAGE 1 PAGE 2 PRINT TICKETS DOCUMENT 1 PRINT TICKET: PORTRAIT PAGE 2 PRINT TICKET: LANDSCAPE DOCUMENT 2 PRINT TICKET: LANDSCAPE |

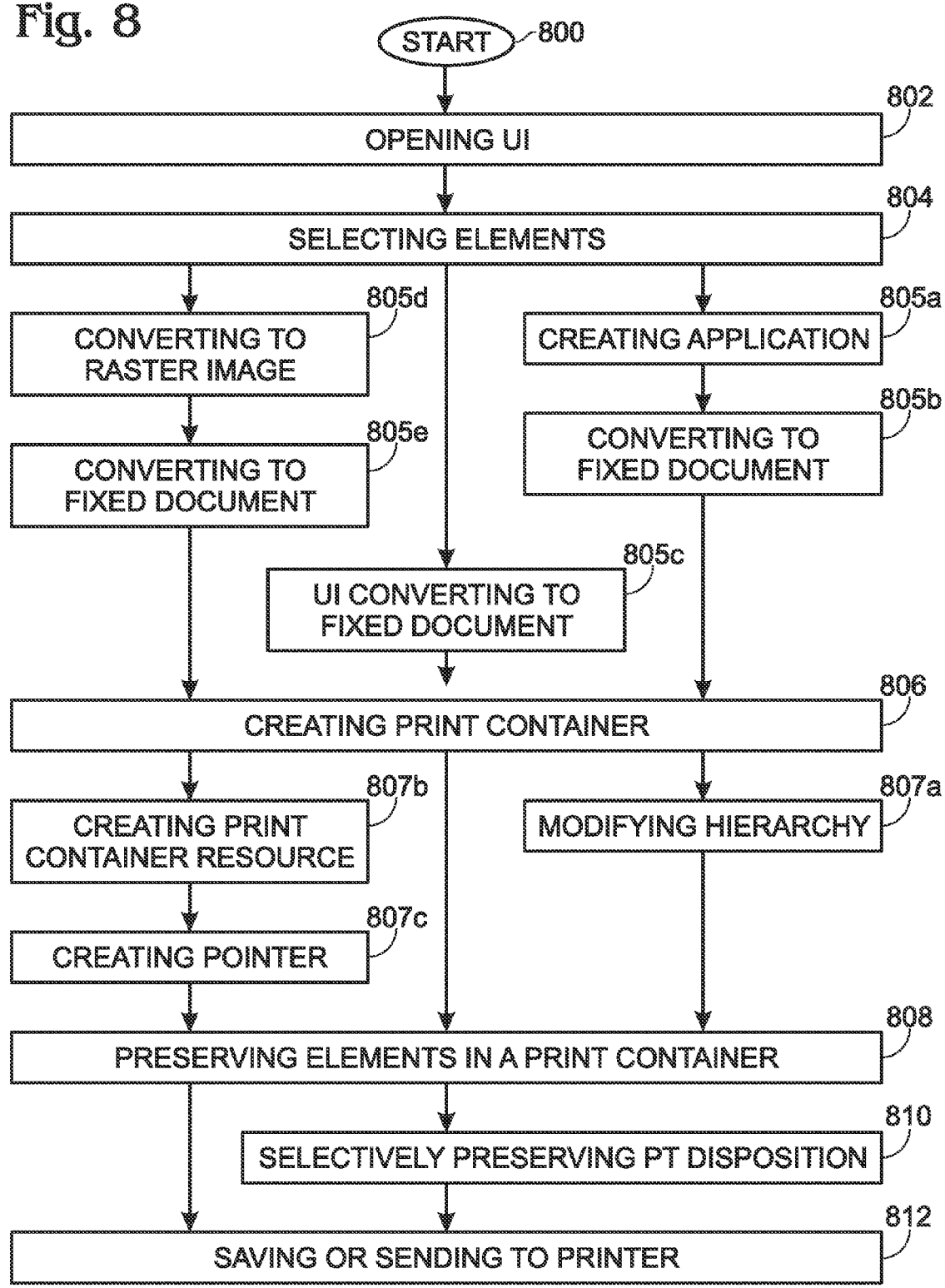

INTERFACE FOR BUILDING A PRINT CONTAINER

BACKGROUND OF THE INVENTION

1. Field of the Invention

This invention generally relates to printer driver software and, more particularly, to a print driver with a user interface for building a print container that preserves separate elements.

2. Description of the Related Art

Conventional methods exist for combining print containers into a single print container. Applications such as SharpDesk™ allow the user to print any document and save the resulting commands as a print container (i.e., a SharpDesk™ document). SharpDesk™ then allows the user to view all such print containers. A useful function in SharpDesk™ consists of combining the print containers into new print containers. This function allows a user to combine related print containers into a single print container that can be printed or sent as email or used in many in document management functions.

More generally, each act of printing involves a single application printing a single document producing a single print container. Normally, the act of printing streams the print container to a spooler or directly to the printer, and the print container is not available to the user. However, most OSs include a "Print to File" capability that saves the print container. To clarify, some terms are presented that are derived from the XML Paper Specification (XPS). For example, the act of printing a single document in an application produces a print container with a single fixed document that include the print commands for rendering the pages in that document. The fixed document contains fixed pages, or the print commands that render each page. Hence, a print container contains only the print commands pertaining to a single fixed document, so the print container is described as a print document. One problem with the merged print container is the loss of distinct fixed documents used to create the merged print container.

An additional issue is the merging of print settings. Print settings are values that affect the way the print commands are executed, for example, landscape vs portrait, 1 up vs 2 up, etc. Conventionally (e.g., GDI printing), print settings are applied at the beginning of the print document, and occasionally as special commands in between pages (resetDC). With this scheme, creating a merged print container by appending a print document involves inserting a resetDC before the new pages are added.

Merging applications strip most of the print settings, except for crucial ones, such as portrait vs landscape. Hence, the merger of multiple print containers into a print container is usually consistent with the print document format built into the OS: the print container contains fixed pages with no distinction of the original print container, and the print settings are a series of resetDCs, again not tied to the original print container.

Another issue in conventional printing is that electronic documents often appear one way when viewed on a monitor screen and another way when printed. Further, many documents depend on locally installed software, fonts, and other resources. When a document is viewed on different computers, aspects of the document, such as page layout, image color, and font style, can change, altering the document's appearance. Consequently, a document's appearance depends greatly on where and how the document is viewed.

The appearance of the printed version of a document can also vary, depending on the printer used. Unfortunately, there is no guarantee that users with different printers attached to different machines will see the exact same document printed on paper as when the document is viewed on the monitor screen.

The above-mentioned issues are being addressed with a document technology called the XML Paper Specification (XPS). This specification is designed to provide users with a consistent document appearance regardless of where and how the document is viewed, and also supports a new document structure for distribution and archiving. This new document structure can include documents created by different applications, all gathered into a single XPS file called a 'container'. The problem is that, at present, there is no convenient way to combine a set of such documents into a single XPS container (file).

In addition, the included set of documents may exist in a variety of application formats, each requiring conversion to the XPS (XML) document format if the user wants to maintain the XPS container as an archival, distributable entity.

Currently, it is possible to construct, manually, an XPS container containing a mix of application derived documents. However, the task is awkward and subject to errors. Also, doing this task manually makes the inclusion of print tickets for the entire container (job level), the specific documents (document level), and within specific sections of a specific document difficult to accomplish. It is also unclear whether Microsoft™ will support adding documents from non-Microsoft applications, although, XPS supports having such a mix of documents.

Lastly, it is unclear whether such capability will include accessing specific files within the XPS container, to add print ticket options without the applications used to originally create the documents.

XPS Documents maintain a consistent appearance for documents—despite environmental variables—through the use of a fixed page layout. XPS Documents are fixed-format documents described by an XML-based language. This means the document layout is fixed, just as it would be if it were printed on a piece of paper. As a result, an XPS viewer and the XPS print path can present the document in the same way to the user, whether it is viewed in a window or on a piece of paper. Custom resources and other application-specific metadata can also be included in an XPS Document, allowing applications to create and use XPS document packages. Unlike other file formats, an XPS container files can be stored and archived with all the content and design details in tact. XPS document packages describe their contents using a plain-text, XML-based data format, as opposed to a proprietary binary format.

Intended as the replacement for the Enhanced Metafile (EMF) format which was the previously used print spooler format in the GDI print path, the XPS document format is the same as the spooler format used in the XPS print path. It serves as the page description language (PDL) for printers. For printers supporting XPS, this eliminates an intermediate conversion to a printer-specific language, increasing the reliability and fidelity of the printed output. The document format consists of structured XML markup that defines the layout of a document and the visual appearance of each page, along with rendering rules for distributing, archiving, rendering, processing and printing the documents. Notably, the markup language for XPS is a subset of XAML, allowing it to incorporate vector-graphic elements in documents, using XAML to mark up the WPF primitives. The elements used are described in terms of paths and other geometrical primitives.

The XPS Document package is a compressed ZIP archive that allows the resulting file to regain some of the space efficiency that is lost by using an XML-based language. The XPS Document package complies with the Open Packaging Conventions.

XPS Documents are stored in a file, called a package, composed of a set of document components, known as parts. A package has a physical and a logical organization. The physical organization consists of the document parts and folders inside the package, and the logical organization is a hierarchy described by the document parts. The XML Paper Specification applies a specific organization and naming convention to the logical layer for XPS documents.

The parts of an XPS document are organized in a logical hierarchy with the FixedDocumentSequence part at the top. An XPS document package may contain more than one document and the sequence of these documents is described by the FixedDocumentSequence part. The FixedDocumentSequence part references the FixedDocument parts that, in turn, reference the pages of each document within the package.

Each FixedDocument part references the pages of that document as FixedPage parts. Each FixedPage part contains the text markup and layout of a page in the document as well as references to images, fonts, and other custom resources used in the page. Resources such as images and fonts are stored in the package but outside of the FixedPage part, allowing them to be shared by other pages. This is especially useful for font resources, but it could also be useful for any image resources that are used on more than one page, such as a watermark or letterhead logo.

FIG. 1 is a diagram depicting the logical hierarchy of an XPS document (prior art). This example shows the contents of a package that contains two separate documents, each containing two pages. The package in this example could be a presentation where FixedDocument_1 contains the slides while FixedDocument_2 contains the background information.

It would be advantageous if the XPS print container concept could be generalized, so as not to depend on particular protocols and operating systems.

It would be advantageous if a print container could be organized to hold separate document elements.

SUMMARY OF THE INVENTION

Described herein is a method for concurrently accessing and compiling documents from a file system, defining the sequence of printing for each document, while specifying the print and finishing options for the job, individual documents, and sections or pages within specific documents. As applied to an XPS printer driver, the conventional driver options are callable by an application. However, the driver feature set also includes a browser for selecting specific files and combining the files into a single XPS file (an XPS container). That is, the XPS print container is treated as a document suitable for distribution to any XPS compliant application or printer.

If the files are not in XPS format, then optionally a conversion can be implemented that produces the XPS format for each embedded file. Print ticket XML tags may be added within the constructed XPS container to create a job level set of print tickets within the XPS container. Alternately, for each document in sequence, a document level set of print tickets can be created. Likewise, for selected pages within each document, a page level set of print tickets can be created. The printing sequence for each document in the XPS container may be specified. As each document is selected a new pane, modal, or otherwise, is opened to allow the user to select specific pages or ranges of pages to be printed within the document. The assembled XPS file can then be sent to a printer according to printing and finishing options previously embedded in the container, along with the options chosen at the time of building the XPS container file.

Accordingly, a method is provided for creating a print container with a series of resident fixed documents. The method opens a user interface (UI). Using the UI, a first plurality of elements stored in memory is selected and a print container is created. The print container preserves a second plurality of elements as separate entities in the print container. For example, a print container may have an element hierarchy of jobs in the print container, fixed documents in a job, and fixed pages in a fixed document may be created.

The print container element hierarchy may be modified. For example, two elements may be merged into a single element. Elements are defined as print containers, fixed documents, application-specific documents, page description language (PDL) documents, extensible markup language (XML) paper specification (XPS) fixed documents, or combinations of the above-mentioned elements. In one aspect, the selected elements are extensible markup language (XML) paper specification (XPS) fixed documents, which are preserved as separate entities in an XPS container.

In one aspect, the method creates a print container resource and creates a pointer associated with an element in the print container. Then, the element is associated with the resource. In another aspect, the selected elements have a print ticket (PT) disposition. That is, the elements either have a PT or not. Then, the method selectively preserves the PT disposition of the elements in the print container.

Additional details of the above-described method are described in more detail below.

BRIEF DESCRIPTION OF THE DRAWINGS

FIGS. 5A and 5B are tables illustrating an exemplary comparison of documents arranged in a GDI print container, with the present invention print container.

FIG. 8 is a flowchart illustrating a method for creating a print container with a series of resident fixed documents.

DETAILED DESCRIPTION

Figure 1:
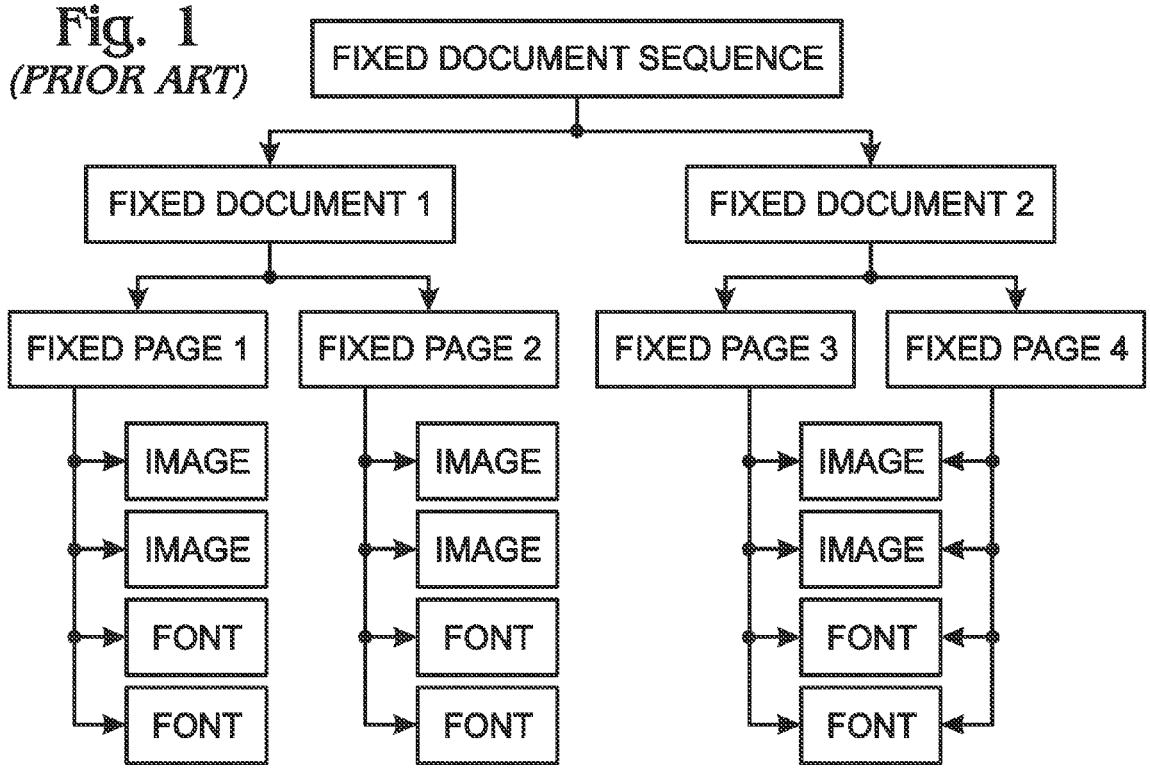
FIG. 1 is a diagram depicting the logical hierarchy of an XPS document (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
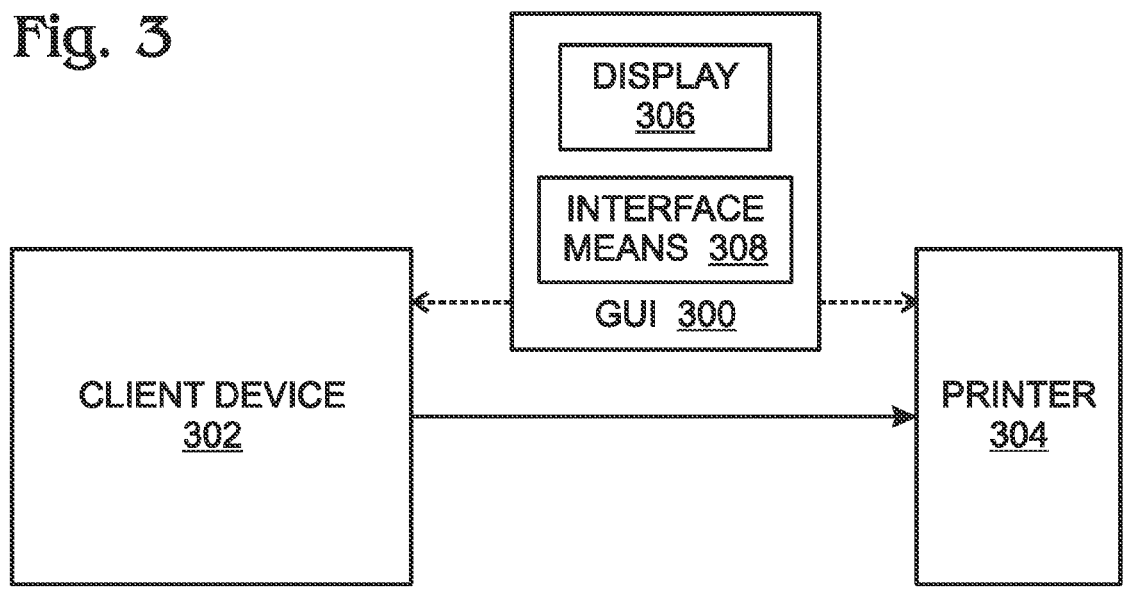
FIG. 3 is a diagram a system for selecting a print job for transmission to a printer.

FIG. 3 is a diagram a system for selecting a print job for transmission to a printer. As represented by the dotted lines, a graphical user interface (GUI) 300 is embedded in either a client device 302 connected to a printer 304, or as a printer document management system installed in the printer 304. More explicitly, the GUI 300 may be associated with a print driver or application embedded with the client device 302. For example, SharpDesk™ is an example of a document application that is also capable of merging documents. The GUI 300 is enabled as a display 306 and an interface means 308 that permits a user to interact or respond to displayed GIU images. The interface means 308 may be a keyboard, keypad, mouse, or touchscreen for example.

A GUI presents graphical icons, visual indicators, or special graphical elements called "widgets". Often the icons are used in conjunction with text, labels, or text navigation to fully represent the information and actions available to a user. But instead of offering only text menus, or requiring typed commands, the actions are usually performed through direct manipulation of the graphical elements.

The window, icon, menu, pointing device (WIMP) paradigm of interaction uses a physical input device to control the position of a cursor and presents information organized in windows and represented with icons. Available commands are compiled together in menus and selected through the pointing device. Typically, the user interacts with information by manipulating visual widgets that allow for interactions appropriate to the kind of data held. The widgets of a well-architected interface are functionally independent from and indirectly linked to application functionality, so the GUI can be easily modified.

The visible graphical interface features of an application are sometimes referred to as "chrome". Larger widgets, such as windows, usually provide a frame or container for the main presentation content such as a web page, email message, or drawing. Smaller widgets usually act as a user-input tool.

Figure 4A:
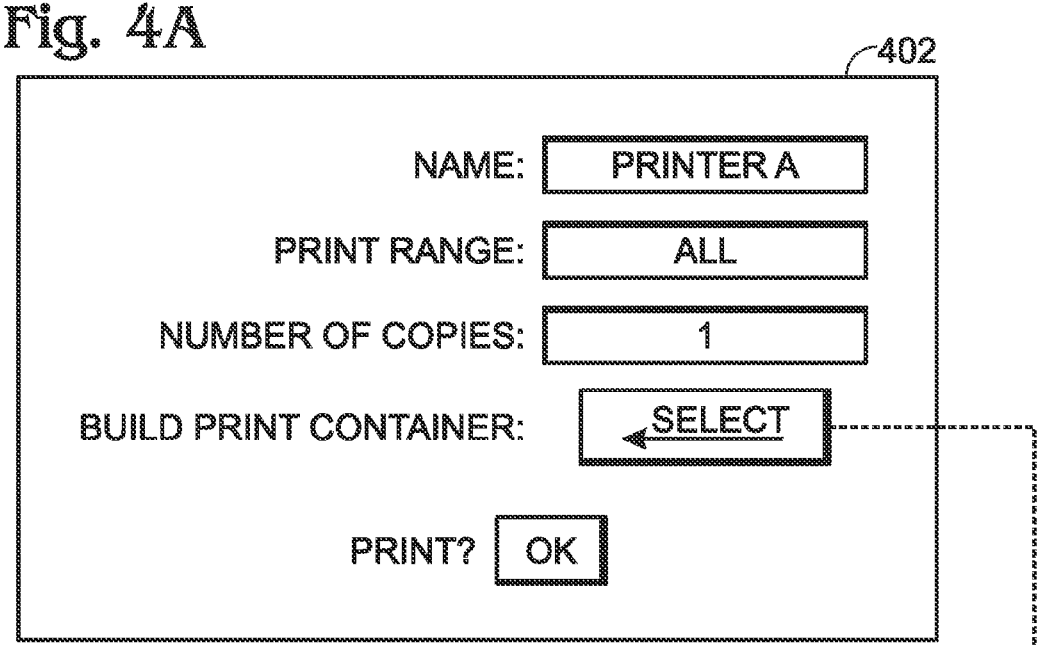
FIGS. 4A and 4B are diagrams depicting an exemplary graphical user interface (GUI) for creating a print container with a series of resident fixed documents.
Figure 4B:
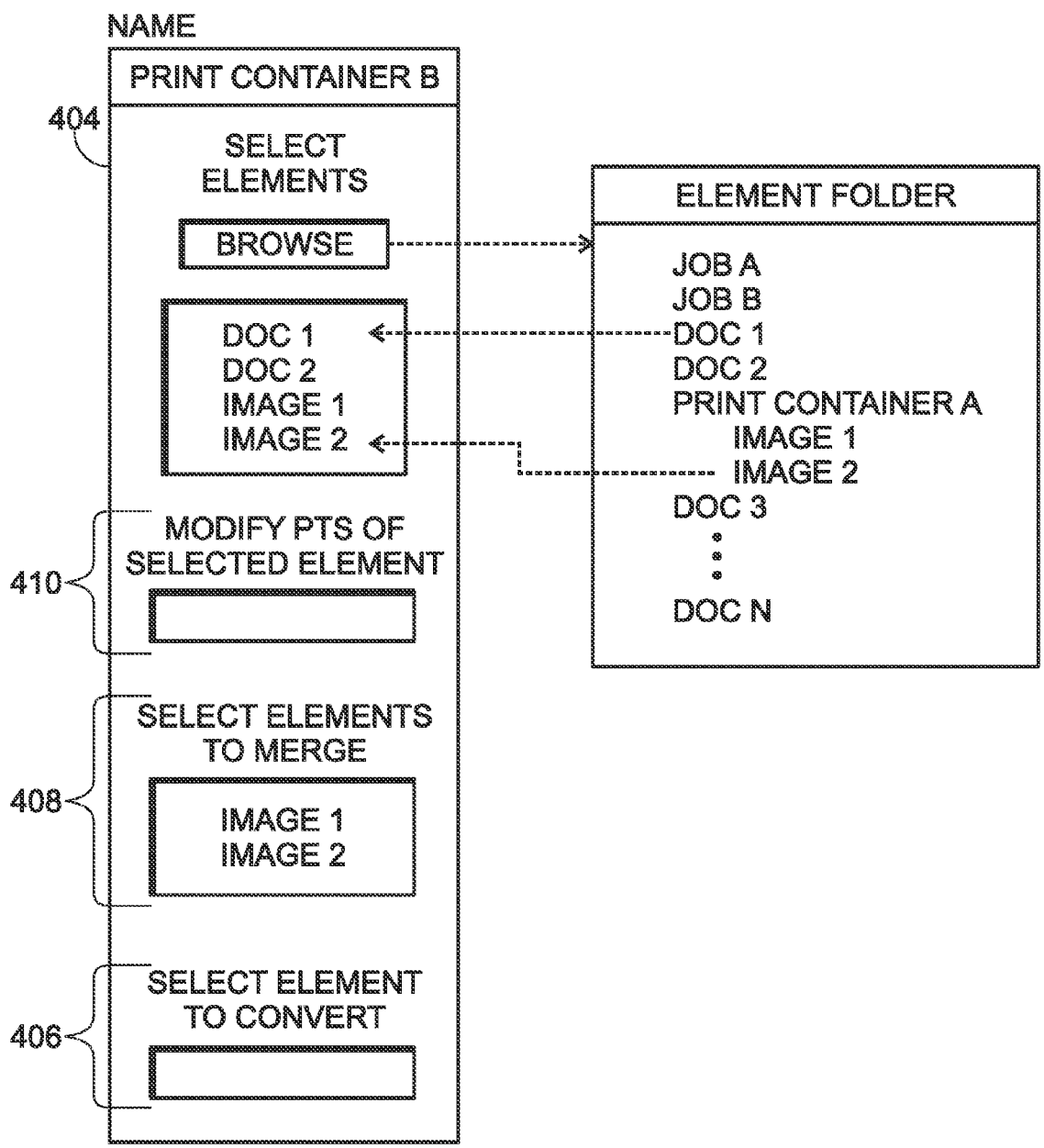

FIGS. 4A and 4B are diagrams depicting an exemplary graphical user interface (GUI) for creating a print container with a series of resident fixed documents. As used herein, a fixed document is defined as a document that includes print commands for rendering a document of one, or more pages. That is, a fixed document includes fixed pages and/or print comments (e.g., PDL) for rendering each page. Likewise, a fixed page is a page that includes print commands for rendering that page. The GUI 400 comprises a first graphic icon printer selection menu 402. As shown, a select "button" may be used to choose a container builder option. A second graphical icon 404 is used for selecting a first plurality of elements stored in memory. Elements are defined herein as print containers (e.g., an XPS print container), fixed documents, application-specific documents, page description language (PDL) documents, extensible markup language (XML) paper specification (XPS) fixed documents, and combinations of the above-mentioned elements. Examples of fixed documents include pdf files, raster images, and XPS fixed documents, to name a few.

As shown, elements doc1, doc2, and print container A have been selected. The second graphical icon 404 preserves a second plurality of elements as separate entities in the print container. In one aspect, the first plurality is equal in number to the second plurality. For example, three documents may be selected and saved as three elements in print container B (not shown). As shown, selected print container A includes two documents, so that 3 elements are selected, but 4 elements are preserved in print container B.

In one aspect, the second graphical icon 404 selects an application-specific document. For example, image 2 may be a drawing in Microsoft Word™. In this aspect, the GUI further comprises a third graphical icon 406 for converting the application-specific document to a fixed document. In another aspect, selected documents may be merged using fourth graphical icon 408. For example, image 1 may be merged with image 2, so that 3 elements are preserved in print container B.

In summary, a browser can be opened and used to select specific files, as shown in FIG. 4B. The list of files selected by the user may be combined into a single file called a print container (e.g., an XPS container). If the files are not in the desired format, then optionally a conversion could be implemented that produces a fixed document. A fifth graphical icon can be used to add of modify print tickets for selected elements. For example, a job level set of print tickets may be created within the print container. Alternately, a document level set of print tickets may be created for each document, in sequence, or a page level set of print tickets may be selected pages within each document.

The user can use the GYI to access, sequentially, individual documents and containers, make conventional selections for printing and finishing options, create fixed documents as output, and then place the document in a print container. Without closing the print container, the user can then access another document and continue the process of building print tickets for that document, saving the results in the same print container file as the previous document.

In one mode of operation, the GUI merely accumulates the individual elements, one at a time, providing the user the opportunity to add, modify, or delete existing print tickets. The user can store the modified document into the print container and select a new element, continuing the operation until all elements are put in the container and the container stored or sent to a printer.

In a different mode of operation, the user can select a file in the format created by the originating application. In this case, the GUI opens the application and uses it to convert the file to a fixed file, then proceeding as described in the preceding paragraph, adds print tickets.

Afterwards, the user may be prompted by the print driver UI for any job level options. The print driver then converts the job level selections into job level print tickets and places them in the correct locations within the print container file.

Functional Description

Using the above-described print container GUI, two new capabilities are available for the printing of documents:

a) An extra level of hierarchy exists in the print container. That is, a job may contain multiple documents;

b) Print Settings may be organized by Job, Document, and Page—instead of resetDCs.

Using the print container building process, a user can distinguish the sections of the printout that belong to which original documents. Further, the user can set print settings at the different levels easily. For example, a user can set the first document to 2 up while the second document remains 1 up. This type of hierarchical manipulation of print settings is more intuitive than inserting resetDCs.

It is notable that there are several conventional applications that allow merging of XPS containers. However, these merging applications do not keep separate the individual documents or the print settings.

FIGS. 5A and 5B are tables illustrating an exemplary comparison of documents arranged in a GDI print container, with the present invention print container. In FIG. 5A, one source document is called "My report" and it includes 3 separate pages. In the GDI container, ResetDCs are used to separate the pages so that the page orientation (landscape/portrait) can be called. In the present invention print container, Print Tickets are used for orientation.

Figure 6:
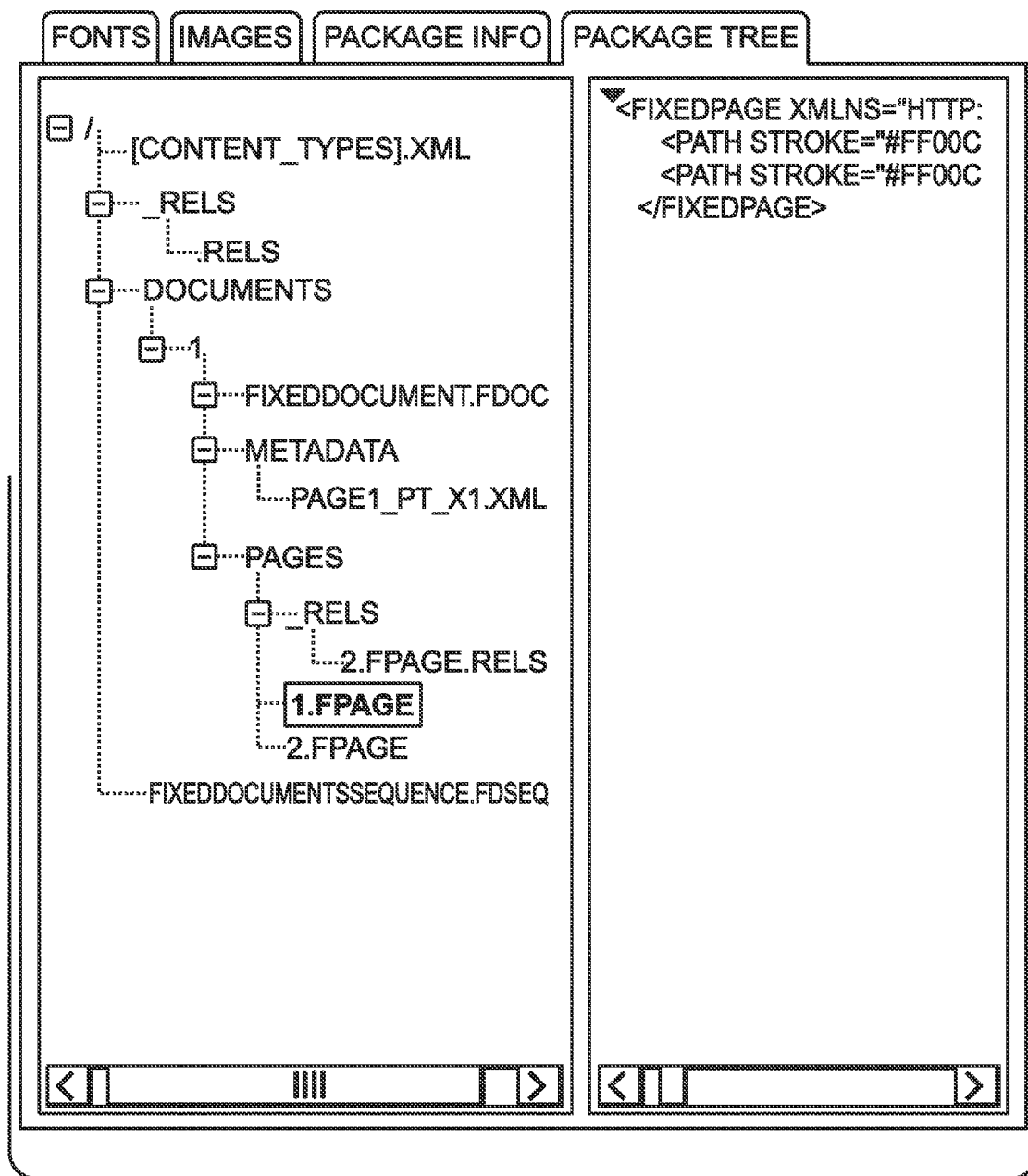
FIG. 6 is a diagram depicting an exemplary hierarchy of elements in a print container.

FIG. 6 is a diagram depicting an exemplary hierarchy of elements in a print container. The documents can be any mix created by different applications, i.e., the set of documents is not restricted to the same vendor, and they are not restricted to the same applications. Applications capable of 'exporting' their files can be called by the print driver to complete the conversion process. The driver can be extended to convert application specific files to a fixed file format for applications not capable of 'exporting' their own files, including archived legacy documents. The user can build the print container from a mix of existing print containers, fixed documents, and application-specific documents. The user can organize the print container at the job level, the document level, and the page level all at the same time, using familiar (printer driver) software with intuitive extensions. The printer driver automates many manual functions, such as, opening the application associated with the document being worked on in order to facilitate an image processing interaction between the application and the printer driver.

Figure 7:
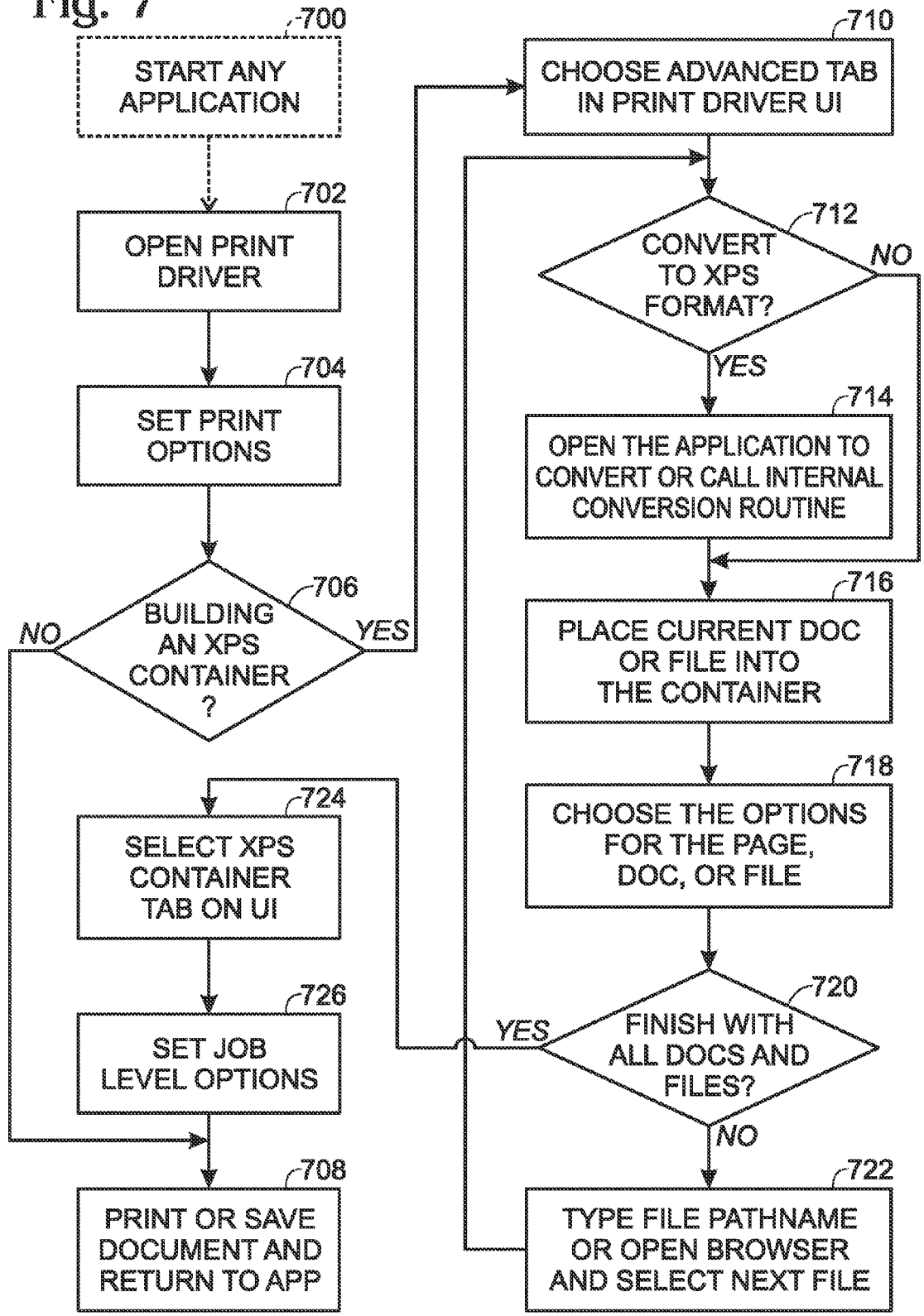
FIG. 7 is a flowchart illustrating the building of an XPS print container using the present invention processes.

FIG. 7 is a flowchart illustrating the building of an XPS print container using the present invention processes. In Step 700, open any application with the document identified. In Step 702, open the present invention printer driver (e.g., the GUI of FIGS. 4A and 4B). Set the print options for the document in Step 704. In Step 706 a decision is made whether to build an XPS print container. When the user only wants to print the document and not save the XPS file, the user chooses 'OK' and exits to Step 708. When the user wants to construct an XPS container of multiple documents, the user chooses the select tab on the UI (Step 710) and goes to Step 712 (see FIG. 4A). In Step 712 a decision is made whether to convert formats. For the currently opened document, if the document is already in XPS format, place the document in the XPS container under construction by the print driver (go to Step 716). If the document is not already in XPS format, request the application to 'export to XPS' if possible. If the document is in the format native to the application, request file-print and convert to XPS using XPSdrv (Step 714). For legacy documents where the application is no longer available, the print driver may enclose the document in a document folder associated with a print ticket/private tag and place it into the XPS container. This option would be useful for printers capable of processing the PDL in the firmware. Non-enabled printers would most likely just ignore the document embedded in the XPS container. For documents stored as a PRN file, the print driver may be extended to convert the document, e.g., create a raster version, before storing in the XPS container, along with appropriate print tickets.

In Step 718 the printing and finishing options are set for the document. In Step 720 a decision is made as to whether processing is finished. If there are more documents to place in the XPS container, the process goes through Step 722 back to Step 712. If the are no more documents to process, the Job Print Ticket Tags are set, and the XPS container is saved using the filename created by the user (Steps 724 and 726). Then, the process goes to Step 708 to exit or first print, then exit.

FIG. 8 is a flowchart illustrating a method for creating a print container with a series of resident fixed documents. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 opens a user interface (UI), such as the GUI shown in FIGS. 4A and 4B, which may be embedded in a client computer as an application (e.g., SharpDesk™) or a print driver, or as a printer management system installed on a printer. Using the UI, Step 804 selects a first plurality of elements stored in memory. Step 806 creates a print container. Referencing FIG. 3, Step 806 creates the print container at the node of a UI in embedded in either the client computer device 302 or in the printer 304. Step 808 preserves a second plurality of elements as separate entities in the print container. Step

812 either saves the print container in memory or sends the print container to a printer for printing.

In one aspect, Step 807*a* modifies the print container element hierarchy. For example, selected elements may be merged. The first and second plurality may, or may not be the same value. Merging elements (Step 807*a*) reduces the number of elements preserved in the print container. Alternately, if a print container is selected in Step 804 with a plurality of elements, the print container may preserve a larger number of elements than were originally selected.

Some examples of elements include print containers, fixed documents, application-specific documents, page description language (PDL) documents, extensible markup language (XML) paper specification (XPS) fixed documents, and combinations of the above-mentioned elements.

In one aspect, preserving each element as a separate entity in the print container in Step 808 includes creating a print container element hierarchy of jobs in the print container, fixed documents in a job, and fixed pages in a fixed document.

In another aspect, subsequent to selecting an application-specific document in a first format (Step 804), Step 805*a* automatically calls an application to which the first format is native. Step 805*b* uses the called application to convert the application-specific document to a fixed document. Alternately, in Step 805*c* the UI converts an application-specific document into a fixed document.

In another variation, subsequent to selecting a first element in Step 804, Step 805*d* converts the first element into a series of raster images, and Step 805*e* converts the series of raster images to a fixed document. Alternately, Step 805*d* converts the first element into a multi-page raster image subsequent to selecting a first element, and Step 805*e* converts the multi-page raster image into a fixed page in a fixed document. For example, a fixed document may be converted into a raster image, which is a type of fixed document. Each raster image can be a standard fixed page, or a non-standard fixed page, which points to a non-standard raster image.

In another aspect, Step 807*b* creates a print container resource. Step 807*c* creates a pointer associated with an element in the print container, associating the element with the resource. Some examples of resources include fonts, images, and custom resources (e.g., pdf files).

In a different aspect, selecting the plurality of elements in Step 804 includes selecting elements, where each element has a print ticket (PT) disposition. Then, Step 810 selectively preserves the PT disposition of the elements in the print container. Alternately stated, Step 810 creates a PT hierarchy of job PTs in the print container, fixed document PTs in a job, and fixed page PTs in a fixed document. Alternately, Step 810 may modify the PT hierarchy.

Alternately stated, all or part of the PT dispositions from the elements selected in Step 804 may be preserved. In some aspects, inconsistent settings are not preserved. For example, one document from one container may be set to print on transparencies, while another document from a second container may be set to be stapled. In this scenario, it may be desirable to ignore one of the settings. Further, there may be a merging issue: each original print container may have different job level print tickets, and since there is no way of including both job level print tickets, they can be merged.

In one aspect, Step 804 selects extensible markup language (XML) paper specification (XPS) fixed documents, and Step 808 preserves the selected XPS fixed documents as separate entities in an XPS container. In another aspect, the selected document (not necessarily an XPS fixed document) is converted into a raster image. Step 808 preserves the raster image as a separate entity in the XPS container.

Figure 2:
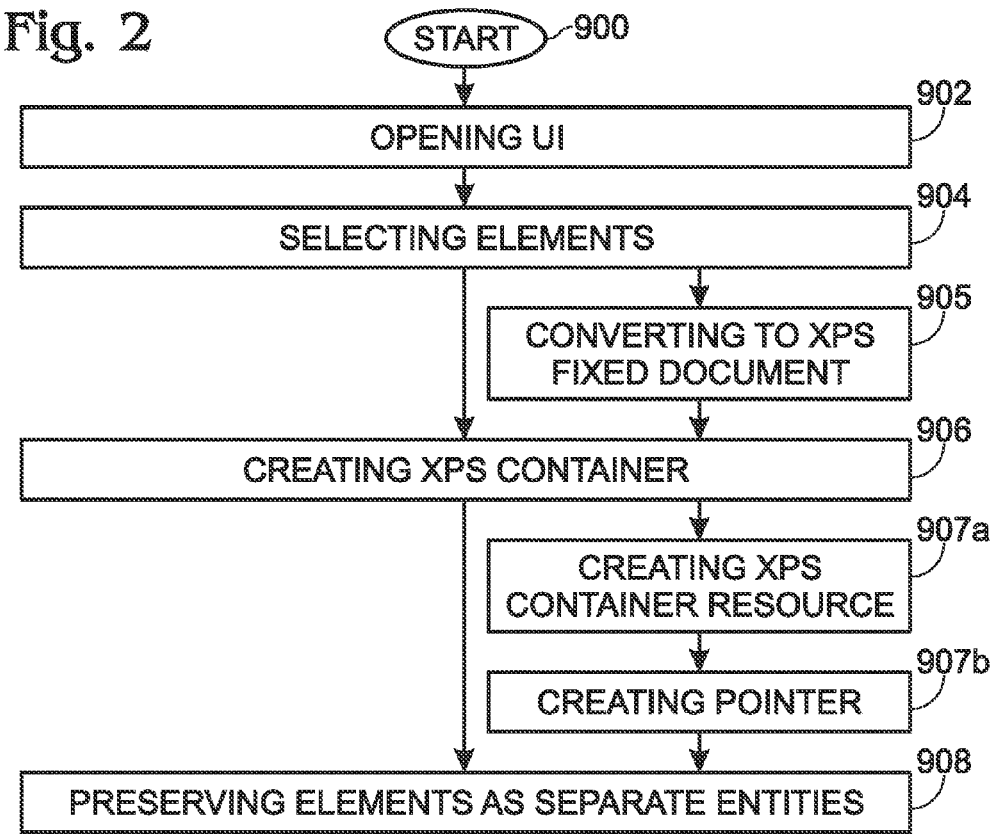
FIG. 2 is a flowchart illustrating a method for creating an extensible markup language (XML) paper specification (XPS) container with a series of resident fixed documents.

FIG. 2 is a flowchart illustrating a method for creating an extensible markup language (XML) paper specification (XPS) container with a series of resident fixed documents. The method starts at Step 900. Step 902 opens a UI. Using the UI, Step 904 selects a plurality of elements stored in memory. The elements may be XPS containers, XPS fixed documents, application-specific documents, page description language (PDL) documents, and combinations of the above-mentioned elements. Step 906 creates an XPS container. Step 908 preserves each element as a separate entity in the XPS container.

In one aspect, selecting the plurality of elements stored in memory in Step 904 includes selecting an application-specific document. Then Step 905 converts the application-specific document to an XPS fixed document.

In another aspect, Step 904 selects elements, where each element has a PT disposition. Step 908 selectively preserves the PT disposition of the elements in the XPS container. In a different aspect, Step 907*a* creates an XPS container resource, and Step 907*b* creates a pointer associated with an element in the print container, associating the element with the resource.

A method of creating a print container has been presented, with an associated print driver GUI, for preserving the separation of elements in the container. Examples of particular structures and process steps have been given to illustrate the invention. However, the invention is not limited to merely these examples. Other variations and embodiments of the invention will occur to those skilled in the art.

We claim:

1. A method for creating a print container with a series of resident fixed documents, the method comprising:
opening a user interface (UI);
using the UI, selecting a first plurality of elements stored in memory;
creating a print container at a node selected from a group consisting of an application embedded with a client computer, a print driver embedded with a client computer, and a printer document management system installed in a printer; and,
preserving a second plurality of elements as separate entities in the print container.

2. The method of claim 1 wherein preserving each element as a separate entity in the print container includes creating a print container element hierarchy of jobs in the print container, fixed documents in a job, and fixed pages in a fixed document.

3. The method of claim 2 further comprising:
modifying the print container element hierarchy.

4. The method of claim 1 wherein selecting the plurality of elements stored in memory includes selecting elements from a group consisting of print containers, fixed documents, application-specific documents, page description language (PDL) documents, extensible markup language (XML) paper specification (XPS) fixed documents, and combinations of the above-mentioned elements.

5. The method of claim 1 further comprising:
subsequent to selecting an application-specific document in a first format, automatically calling an application to which the first format is native; and,
using the called application to convert the application-specific document to a fixed document.

6. The method of claim 1 further comprising:
the UI converting an application-specific document into a fixed document.

7. The method of claim 1 further comprising:
subsequent to selecting a first element, converting the first element into a series of raster images; and,
converting the series of raster images to a fixed document.

8. The method of claim 1 further comprising:
subsequent to selecting a first element, converting the first element into a multi-page raster image; and,
converting the multi-page raster image into a fixed page in a fixed document.

9. The method of claim 1 further comprising:
creating a print container resource; and,
creating a pointer associated with an element in the print container, associating the element with the resource.

10. The method of claim 1 wherein selecting the plurality of elements includes selecting elements, where each element has a print ticket (PT) disposition; and,
the method further comprising:
selectively preserving the PT disposition of the elements in the print container.

11. The method of claim 10 wherein selectively preserving the PT disposition of the elements in the print container includes creating a PT hierarchy of job PTs in the print container, fixed document PTs in a job, and fixed page PTs in a fixed document.

12. The method of claim 10 wherein selectively preserving the PT disposition includes modifying a PT hierarchy of job PTs in the print container, fixed document PIN in a job, and fixed page PTs in a fixed document.

13. The method of claim 1 wherein selecting the plurality of elements includes selecting extensible markup language (XML) paper specification (XPS) fixed documents; and,
wherein preserving each element as a separate entity in the print container includes preserving the selected XPS fixed documents as separate entities in an XPS container.

14. The method of claim 13 wherein selecting the plurality of elements includes:
selecting a first document;
converting the first document into a raster image;
wherein preserving each element as a separate entity in the print container includes preserving the raster image as a separate entity in the XPS container.

15. The method of claim 1 further comprising:
performing an action selected from a group consisting of saving the print container in memory and sending the print container to a printer for printing.

16. A method for creating an extensible markup language (XML) paper specification (XPS) container with a series of resident fixed documents, the method comprising:
opening a user interface (UI);
using the UI, selecting a plurality of elements stored in memory;
creating an XPS container; and,
preserving each element as a separate entity in the XPS container.

17. The method of claim 16 wherein selecting the plurality of elements stored in memory includes selecting elements chosen from the group consisting of XPS containers, XPS fixed documents, application-specific documents, page description language (PDL) documents, and combinations of the above-mentioned elements.

18. The method of claim 16 wherein selecting the plurality of elements stored in memory includes selecting an application-specific document; and,
the method further comprising:
converting the application-specific document to an XPS fixed document.

19. The method of claim 16 wherein selecting the plurality of elements includes selecting elements, where each element has a print ticket (PT) disposition; and,
the method further comprising:
selectively preserving the PT disposition of the elements in the XPS container.

20. The method of claim 16 further comprising:
creating an XPS container resource; and,
creating a pointer associated with an element in the print container, associating the element with the resource.

21. A graphical user interface (GUI) for creating a print container with a series of resident fixed documents, the GUI comprising:
a first graphical icon for selecting a container builder option; and,
a second graphical icon for selecting a first plurality of elements stored in memory, preserving a second plurality of elements as separate entities in the print container.

22. The GUI of claim 21 wherein the second graphical icon selects elements from a group consisting of print containers, fixed documents, application-specific documents, page description language (PDL) documents, extensible markup language (XML) paper specification (XPS) fixed documents, and combinations of the above-mentioned elements.

23. The GUI of claim 21 wherein the second graphical icon selects an application-specific document;
the GUI further comprising:
a third graphical icon for converting the application-specific document to a fixed document.

24. The GUI of claim 21 wherein the UI is embedded at a node selected from a group consisting of an application embedded with a client computer, a print driver embedded with a client computer, and a printer document management system installed in a printer.

* * * * *

UNITED STATES PATENT AND TRADEMARK OFFICE
CERTIFICATE OF CORRECTION

PATENT NO. : 8,023,135 B2
APPLICATION NO. : 12/040683
DATED : September 20, 2011
INVENTOR(S) : Burton Lee Levin Page 1 of 1

It is certified that error appears in the above-identified patent and that said Letters Patent is hereby corrected as shown below:

In column 11, ln 24 (claim 12), the phrase "PTs" has been incorrectly printed as --PIN--.

Claim 12 should be printed as follows:

12. The method of claim 10 wherein selectively preserving the PT disposition includes modifying a PT hierarchy of job PTs in the print container, fixed document PTs in a job, and fixed page PTs in a fixed document.

Signed and Sealed this
Twenty-second Day of November, 2011

David J. Kappos
*Director of the United States Patent and Trademark Office*